United States Patent [19]

DiDomizio

[11] Patent Number: 5,559,518
[45] Date of Patent: Sep. 24, 1996

[54] LOW TARGET VELOCITY INTERFEROMETRIC AMTI RADAR

[75] Inventor: John A. DiDomizio, Norwalk, Conn.

[73] Assignee: Northrop Grumman Corporation, Los Angeles, Calif.

[21] Appl. No.: 325,524

[22] Filed: Nov. 27, 1981

[51] Int. Cl.$^6$ .................................................. G01S 7/40
[52] U.S. Cl. ........................................................ 342/174
[58] Field of Search ........................... 343/5 CM, 5 FT, 343/7.7, 768; 342/174

[56] References Cited

U.S. PATENT DOCUMENTS

| | | | |
|---|---|---|---|
| 4,086,590 | 4/1978 | Goggins, Jr. | 343/5 CM |
| 4,217,583 | 8/1980 | Hiller et al. | 343/7.7 |

Primary Examiner—Theodore M. Blum

[57] ABSTRACT

An AMTI radar employs a dual cancellation format to cancel the clutter in the radar returns received by the apertures of an interferometric radar antenna. The three-aperture antenna presents the radar returns to three receivers which demodulate the returns to a complex in-phase signal I and a quadrature signal Q which are sampled at a pulse repetition interval at all ranges of interest. After conventional motion compensation four data sets are derived from the returns of the three apertures, $L(t)$, $C(t-\tau)$, $C(t)$ and $R(T-\tau)$ which represents samples taken over multiple pulse repetition intervals for each range interval or bin of interest. The data is processed by both adjacent array processing and outer array processing, the latter only requiring a minimal amount of additional capacity. Compensation phase is further adjusted in a clutter/clutter-free phase calculator allowing a much reduced phase quantity to be applied to the delayed data sets as the second part of the dual cancellation signal. Following subtraction of doppler filter outputs of the delayed data sets from the undelayed data sets in the cancellation/enhancement unit, maximum clutter cancellation is achieved in the clutter region and optimal moving target response is obtained in the clutter-free region. The two-range maps that result after subtraction of the doppler filter outputs are presented to a detection and validation processor to determine range, doppler, amplitude and angle measurements to the moving targets with a high degree of accuracy.

4 Claims, 6 Drawing Sheets

TRIPLE INTERFEROMETRIC SIGNAL CALIBRATION UNIT

LOW TARGET VELOCITY INTERFEROMETRIC AMTI RADAR

CROSS REFERENCE TO RELATED APPLICATIONS

The subject matter of this patent application is related to that disclosed in U.S. patent application Ser. No. 325,523 filed Nov. 27, 1981 by J. DiDomizio for MAXIMIZED/ MINIMIZED PHASE CALCULATOR FOR AN INTERFEROMETRIC AMTI RADAR, U.S. patent application Ser. Nos. 325,522 325,522 filed Nov. 27, 1981 by J. DiDomizio and R. Guarino for CLUTTER SUPPRESSED INTERFEROMETRIC RADAR, and U.S. patent application Ser. No. 325,521 filed Nov. 27, 1981 by J. Alimena and R. Briones for CHANNEL SWITCHING INTERFEROMETRIC AMTI RADAR, all of which are assigned to the same assignee as the present case.

TECHNICAL FIELD

This invention relates to an aircraft-mounted synthetic aperture radar system and, more particularly, to an AMTI radar system that utilizes an interferometric processing technique to enhance identification in the radar returns of low velocity targets.

BACKGROUND ART

An airborne moving target indicator (AMTI) radar is generally known and is the type of radar that has the capability to reject or cancel signals from fixed, or unwanted targets (non-movers), such as buildings, hills, etc. At the same time, such radars typically highlight or enhance the radar return signals from any moving targets (movers) such as aircraft, vechicles, or the like. One technique used in AMTI radar of the coherent type involves utilizing the doppler shift imparted to the reflected radar signals by a moving target as a part of a processing scheme to distinguish a mover from a non-mover. This doppler shift appears as a change in the phase of the received signals between consecutive illuminating radar pulses.

There are a number of problems which must be considered in the processing of radar returns where the AMTI radar is mounted in an aircraft. Because the aircraft is moving with respect to both the fixed and moving targets the radar returns from both target and clutter experience a frequency shift which can be corrected by known motion compensation techniques.

Synthetic-aperture radars are also generally known and such systems generally use a multiaperture antenna together with the movement of the platform on which the antenna is mounted as additional inputs into the processing of return signals in an AMTI radar. While this adds significantly to the complexity of the processing of the radar return signals, clutter cancellation to identify the movers can be significantly enhanced.

One well-known method of compensating for the effects of aircraft motion is known as displaced phase center technique and involves electronically displacing the antenna phase center along the flight path of the aircraft. Briefly, the technique involves the transmission and reception of radar returns by the antenna of the radar system having its phase center at a first known location. A second illuminating pulse is then transmitted and the return stored while the antenna has its phase center at a second known location. The phase centers of the first and second returns are separated by a precisely known distance related to the movement of the aircraft during the interpulse period and, knowing this information, the phase centers can electrically be changed to essentially coincide in time. At that point, the signals received by the multiaperture antenna from clutter, or stationary objects, will have properties suitable to cancellation leaving only the movers to be detected.

One technique for clutter cancellation is described in U.S. Pat. No. 4,093,950 issued Jun. 6, 1978 to T. apRhys for MOTION-COMPENSATION ARRANGEMENTS FOR MTI RADARS. The clutter suppression technique described in this patent is not limited to two pulses at a time but may be applied to a number of pulses. Phase and amplitude adjustments are also made to minimize the effects of antenna construction errors. The antenna subarray have phase centers which are separated by 2 VT. The sum and difference signals from each two adjacent subarray are taken to produce a sum channel and a difference channel for each group of subarrays. After adjustment of the difference channel signal in phase and amplitude, the latest return is added to a delayed return to produce a correction signal. That correction signal is then added to a delayed signal in the corresponding sum channel to provide a signal that is synchronized in time and phase with the most recent signal in the sum channel.

U.S. Pat. No. 3,735,400 issued May 22, 1973 to C. Sletten and F. S. Holt for AMTI RADAR CLUTTER CANCELING METHOD AND APPARATUS describes a three-aperture simultaneous mode clutter and canceller. This clutter cancellation technique is based on the premise that the return signals from stationary targets on the ground arrive at two antenna apertures with a unique and nearly linearly related phase delay as a function of doppler frequency if the antennas are displaced laterally along the aircraft flight path. Ground clutter cancellation can be acheived by a filter that separates the doppler spectrum into narrow channels and applies a given phase shift or delay to the returns in the narrow bandpass filter. Three channels of signal information from a three-aperture antenna are reduced to two clutter cancelled channel. This clutter cancellation technique utilizes only adjacent aperture channels from which the two channels are derived. Range integrations and phase comparisons are performed on each channel of information to provide target detection and angle measurement. One of the limiting characterisitcs of this processing technique is that the antennas must be in a line coincident with the velocity vector of the aircraft. Each of the antenna apertures are spaced apart from the adjacent aperture by a fraction of a wavelength, in this particular case one quarter of a wavelength. Another limitation is that the transmit aperture, this being one of the three receive apertures, is the same aperture as one of the receive apertures and so the transmit and receive antenna beamwidths are identical. This is significant because the resultant doppler spectra in each of the channels is not highly influenced by each beamwidth pattern of the individual receive apertures. Still another limitation of this approach is that the aircraft velocity must be sufficiently large to provide a clutter spectrum of 50 channels or more. Yet another limitation of this technique is that the bandpass filters are controlled by information from the aircraft navigation sensor which inherently has potential errors which should be considered. Also, this processing technique utilizes only three doppler filtering processes which necessarily provides less information compared to a system which incorporates a large number of filtering processes. And finally, although this disclosed technique has a means for compensating for antenna calibration errors, it does not include any compensation by the receive signals to correct for velocity and/or boresite errors.

DISCLOSURE OF INVENTION

It is an object of the present invention to provide an airborne moving target indicator (AMTI) which effectively detects and measures angles to slowly moving target further into main beam clutter.

A feature of the dual cancellation interferometric AMTI radar according to the present invention is that the disclosed technique is not limited to a side-looking radar. Stated differently, it is not necessary that the antenna apertures be oriented along a line which is coincident with the velocity vector of the aircraft. This means that the antenna apertures can be mechanically rotated to any desired direction.

According to another feature of the dual cancellation interferometric AMTI radar of the present invention, the receive apertures of the radar antenna are spaced apart from adjacent apertures by a number of wavelengths. This is significant because it allows the apertures to be much larger in size and also allows the phase centers to be further apart for more angle accuracy.

A particular feature of the low target velocity interferometric AMTI radar according to the present invention is that by the addition of outer aperture array processing to adjacent aperture array processing, probability of detection of low velocity targets is enhanced. Additionally higher probability of detection for moving target are also achieved at all ambigious velocities.

According to another feature of the target velocity interferometric AMTI radar of the present invention, use of outer aperture array processing in addition to adjacent aperture array processing for any given probability of detection lower velocity targets can be detected.

According to another feature of the low target velocity interferometric AMTI radar of the present invention, use of a time delay which is most closely matched to the optimum value for both outer array processing and adjacent aperture array processing eliminates the need to incorporate an additional FFT processor. According to another feature of the low target velocity interferometric AMTI radar of the present invention, the outer aperture amplitude and phase correction signals are simply derived from adjacent aperture information without unduly increasing the complexity associated phase and amplitude processing.

According to another feature of the lower target velocity interferometric AMTI radar of the present invention, an outer aperture processing technique utilizes a fractional doppler map that contains only the low doppler frequency filters so that there is only a minimal increase in additional memory capacity and processing load.

According to yet another feature of the low target velocity interferometric AMTI radar of the present invention, once targets have been identified by the use of outer aperture processing, angle calculation can be still performed by the conventional adjacent aperture processing without diminishing the validity of such calculations.

Another feature of the dual cancellation interferometric AMTI radar according to the present invention, is that the three receive apertures are used together as a transmit aperture so that the transmit antenna beamwidth is one-third as narrow as each of the receive antenna beamwidths. This is meaningful because the resulting doppler spectra in each of the receive channels is not highly influenced by the beamwidth pattern of the individual receive apertures.

An advantage of the dual cancellation interferometric AMTI radar according to the present invention is that the operation is not constrained by low platform velocity. In other words, it is not necessary to have the aircraft move at a sufficiently high speed to obtain an adequate clutter spectrum for the doppler samples.

Another advantage of the dual cancellation interferometric AMTI radar of the present invention is that it includes a compensation means based on the data itself to correct for errors which might be associated with reference signals from a navigation system.

Still another feature of the dual cancellation interferometric AMTI radar of the present invention is that four doppler filtering processes are performed on the data in the three receive channels to generate precise phase compensation for the radar return signals in the clutter spectrum.

Yet another feature of the dual cancellation interferometric AMTI radar according to the present invention is that it compensates the receive signals for inaccuracies associated with velocity and/or boresite errors.

According to the AMTI radar system of the present invention a dual cancellation format is utilized in the process of clutter returns received by three apertures of an interferometric antenna. The three-aperture antenna provides complex in-phase and quadrature signals which are sampled each pulse repetition interval (PRI) in an A/D converter at all ranges of interest. A particular advantage is that it eliminates the normal restriction that the radar pulse repetition frequency (PRF) required to achieve a high degree of clutter cancellation be related to the aircraft velocity and interarray spacing. This increases the radar capability by allowing variable PRF radar transmission. In turn this provides an increase in unambiguous target velocities and eliminates low velocity blind speeds. An added advantage is the increase in average power that can be transmitted with the use of a higher PRF, hence improving the range at which moving targets can be detected.

Four data sets are generated from the motion compensated signal received from the three apertures. The sets $L(t)$, $C(t-\tau)$, $C(t)$ and $R(t-\tau)$ represent samples taken over multiple pulse repetition intervals for each range interval or bin of interest. The time $\tau$ is roughly equal to 0.75 d/v and is used to provide the first phase correction of the dual cancellation scheme for both adjacent and outer aperture cancellation procedures.

In the clutter-free region, the FFT outputs (one per aperture) are noncoherently integrated for detection, and the outer two are used for angle measurement, in a known manner.

Other objects, features and advantages will become apparent in light of the following description of the invention.

Best Mode for Carrying Out the Invention

Figure 1:
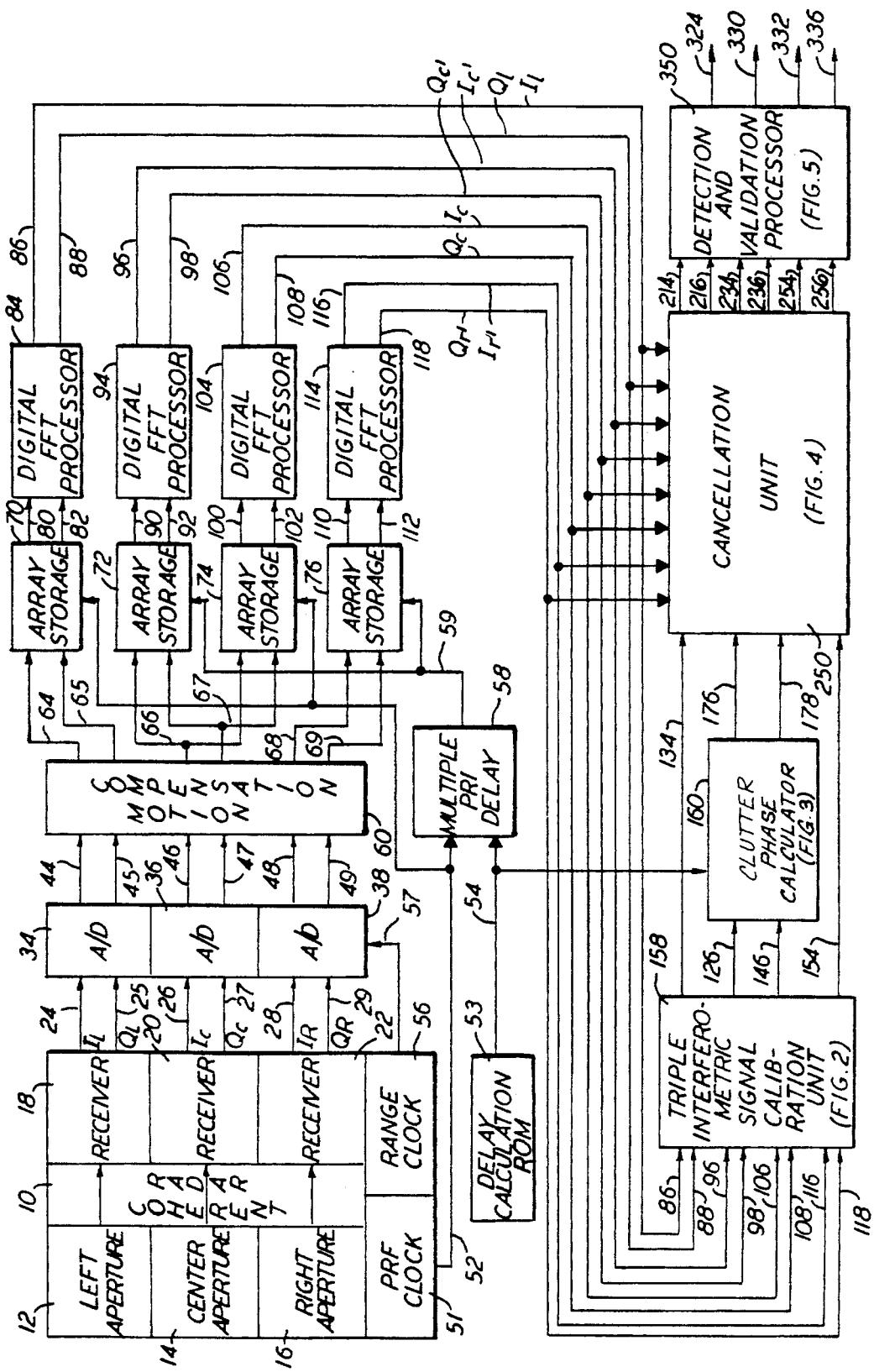
FIG. 1 is a block diagram drawing of one embodiment of a dual cancellation interferometric AMTI radar system according to the present invention.

Referring initially to FIG. 1, there is seen one embodiment of a dual cancellation interferometric AMTI radar according to the present invention. This technique is particularly well suited to suppressing clutter in a radar system whose performance is limited by the effects of platform motion. The present invention is utilized in processing signals acquired by a radar 10 of the coherent type which is known in the art. The radar system includes a left aperture 12, a center aperture 14 and a right aperture 16 that are provided by an array antenna or the like. Each aperture provides a signal indicative of radar returns to a receiver 18, a receiver 20 and a receiver 22.

A particular feature of the present invention is that the antenna beamwidths of the left, center and right apertures are substantially identical and are broader than the illuminating aperture beamwidth, (the illuminating aperture beam is more narrow by a factor of 3). As is known, each of the receivers typically converts the radar signals received at RF frequency range first to an IF frequency and then to a video signal of two different channels that are shifted in phase by 90°. In other words, the receiver 18 for the left aperture has as outputs an in-phase component ($I_L$) 24 and a quadrature component ($Q_L$) 25, the receiver 20 for the center aperture 14 has as outputs an in-phase component ($I_C$) 26 and a quadrature component ($Q_C$) 27 and the receiver 22 for the right aperture has as outputs an in-phase component ($I_R$) 28 and a quadrature component ($Q_R$) 29.

The I and Q video signals from the receivers 18, 20 and 22 are provided to analog-to-digital (A/D) converters 34, 36 and 38, respectively, so that the signals on the lines 44 and 45, the lines 46 and 47 and the lines 48 and 49, are digital representations of the magnitudes of in-phase and quadrature components of each signal received by the radar apertures. The remainder of the disclosure is digital in nature and for simplicity the representations in FIG. 1 are shown with individual signal lines rather than trunk lines to accommodate binary signals.

It also should be understood that all signals described hereinafter are the actual radar return signals or they are signals upon which modifications or changes have been performed in accordance with the described process. All such processes are performed with the requisite degree of fineness so that there is no significant error that arises as a result of quantization noise. The coherent radar 10 includes a pulse repetition frequency (PRF) clock 51 to provide timing signals on the line 52 related to each transmission or illuminating pulse from the radar system. A particular feature of the present invention is that the PRF utilized in this configuration is not restricted to any relationship in which aircraft motion perpendicular to the antenna orientation in a pulse repetition interval (PRI) must be a fixed factor of antenna array spacing. In addition a range clock 56 provides a high frequency timing signal on the line 57 defining each of the range bins associated with the return radar signal and also providing sampling strobes for each of the A/D converters.

The I and Q signals, in digital form, from the left aperture 12, the center aperture 14, and the right aperture 16 are fed to a motion compensation unit 60. An inertial navigation system, (not shown), or other similar system on the radar platform provides digital signals indicating platform motion to the motion compensation unit. The received radar signals are complex multiplied by the signals received from the inertial navigation system. A complex multiplier circuit is generally known in the art and the purpose of the complex multiplier is to rotate the incoming radar data in any given range bin during a given PRI by another signal that represents the platform motion with respect to the range bin of interest. This results in the compensation of the data for platform motion, thus correcting for the doppler frequency at the center of the radar beam. The signals from the motion compensation unit 60 are on the lines 64 through 69 and these signals represent the in-phase component I and quadrature component Q of the motion compensated signals received by the left, center and right apertures, respectively.

Four bulk memory devices are used for array storage; memory 70, memory 72, memory 74 and memory 76. Each memory device is of sufficient size to record $N_d$ PRIs of data for each of $N_r$ range bins. The memories 72 and 74 accept data from the center aperture receiver, the memory 70 accepts data from the left aperture and the memory 76 accepts data from the right aperture. A particular feature of the present invention is that the data in these bulk memories is read in at different times. In other words, there are two separate time periods in which data is recorded, one for the left and a center device together and the other for the right and the other center device together. The data gate 52 that controls the left and the center allows the storage of the first $N_d$ samples taken (i.e., samples L through $N_d$) whereas the data gate 59 that controls the center and the right allows the storage of $N_d$ samples delayed in time by N PRIs (i.e., samples L+N through $N_d$+N through the multiple PRI delay unit 58. The data gate delay is controlled by line 54 from the delay calculation read only memory (ROM) 53.

One feature of the present invention is that the multiple PRI delay for the optimum clutter cancellation is calculated in a delay calculation ROM 53. The delay calculation ROM 51 has three inputs, aircraft velocity v, pulse repetition frequency $f_r$ and interarray spacing d. The output of the delay calculation ROM 53 on the line 54 is the number of PRI delays, N, which is the closest integer to $f_{rd}/(1.5\ v)$. The adjacent array spacing, d, is a constant for all signal sets, the number of different pulse repetition frequencies, $f_r$, are limited and the aircraft velocity, v, can be quantized to a low bit level so that the output, N, will generally be a small set of numbers which can be represented by a simple digital code when stored in the ROM. This N represents the delay which will provide near optimum clutter cancellation for both adjacent array and outer array signal processing. In general, optimum clutter cancellation for the adjacent array and the outer array requires different N's. However, to implement this optimum clutter calculation would require the use of an additional, or fifth FFT processor which would add significant complexity to the processing scheme. The best balance between performance and hardware achieved through the use of a single N which most closely approximates the optimum N under both adjacent and outer conditions.

A particular feature of the present invention is that Fourier transforms of all of the data points are taken so that phase corrections for clutter cancellation can be applied in the frequency domain thus removing constraints inherently imposed by time domain cancellation. Accordingly, a digital FFT processor 84 is connected by the lines 80 and 82 to the memory 70 for the left aperture and transforms the time history contained therein to $I_L$ and $Q_L$ signals on the lines 86 and 88 which provide a frequency domain representation of the received data. A digital FFT processor 94 is connected to the array storage device 72 by the lines 90 and 92 and provides a comparable signal transform to the frequency domain for signals $I_C$, and $Q_C$, on the lines 96 and 98. A digital FFT processor 104 receives data stored in the array storage 74 in time sequence on the lines 100 and 102 and transforms this information into frequency domain signals $I_C$ and $Q_C$ on the lines 106 and 108. Likewise, in a Similar fashion, a digital FFT processor 114 receives data from the right aperture that is stored in the array storage 76 on the lines 110 and 112, respectively, and provides output signals $I_R$, and $Q_R$, on the lines 116 and 118 which corresponds to this data in the frequency domain. The primed subscripts used (i.e., $I_{C'}$) indicate delayed data sets while the unprimed subscripts (i.e., $I_L$) indicate undelayed data sets. In other words, each FFT processor converts the $N_D$ samples of the time history, of each of the returns in $N_R$ range bins, into the corresponding $N_D$ samples of frequency domain information. At the output of each FFT processor we have the frequency characteristics for each range bin, this being referred to as a range doppler map, of a size $N_R$ range bins by $N_D$ doppler filters.

Figure 2:
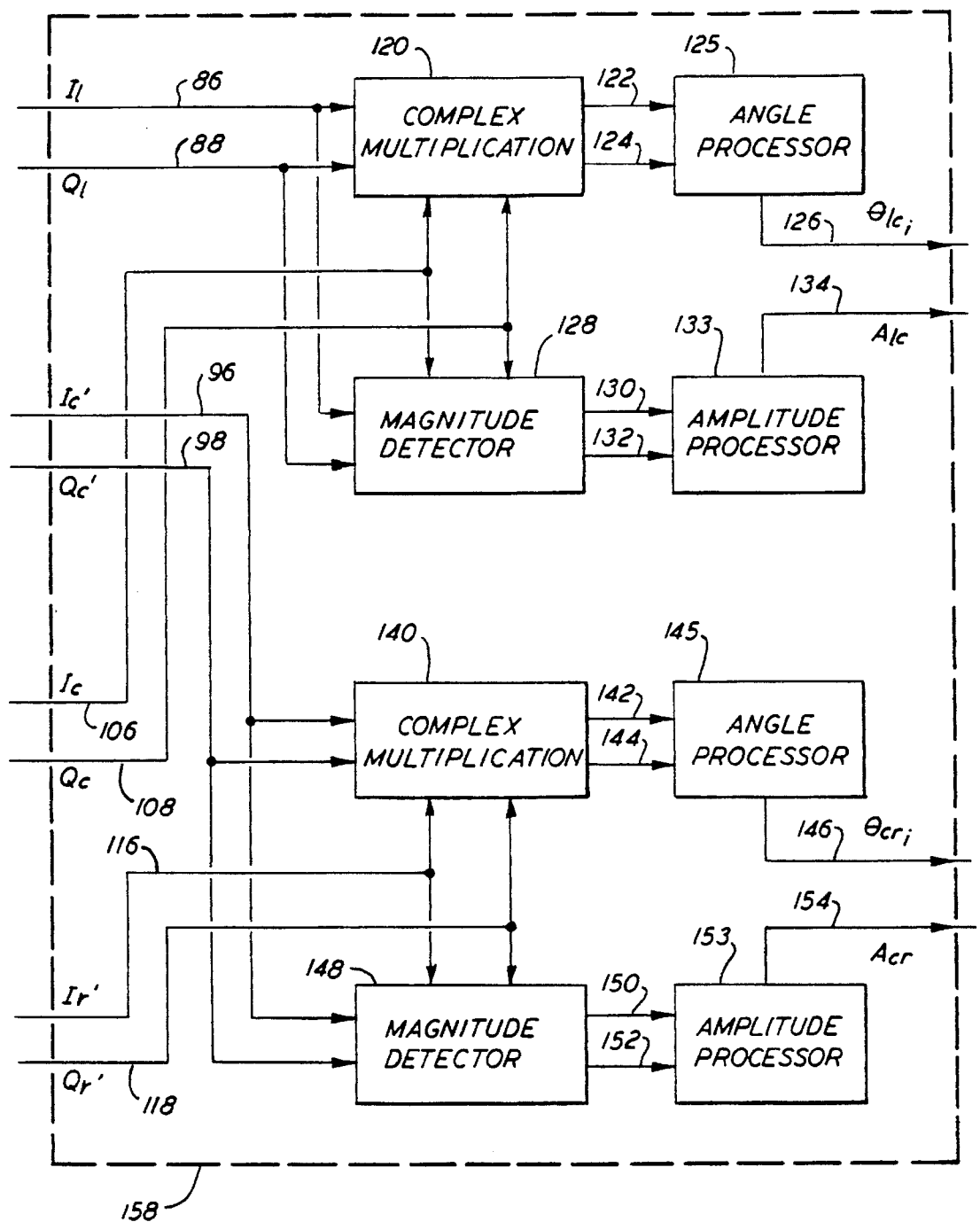
FIG. 2 is a drawing in block form of the triple interferometric signal calibration unit shown in FIG. 1.
Figure 3:
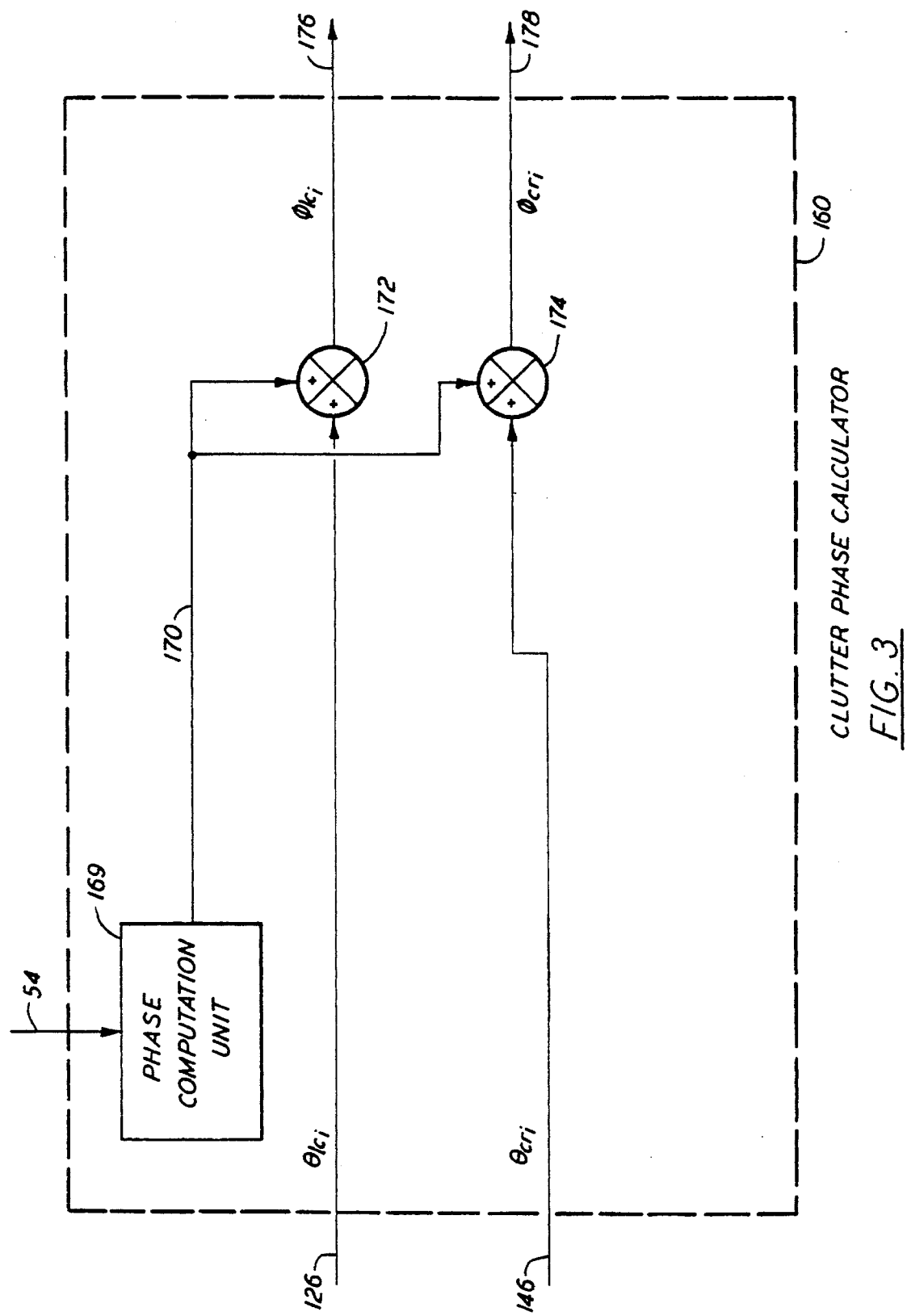
FIG. 3 is a drawing in block diagram form depicting the clutter phase calculator shown in FIG. 1.

A particular feature of the present invention is that the triple interferometric signal calibration unit 158 utilizes the range gated doppler filtered multiple channel signal information and generates phase and amplitude calibration signals. Referring now to FIG. 2 one embodiment of the triple interferometric signal calibration unit will now be described. The triple interferometric signal calibration unit is essentially composed of two halves, one which operates on the left and center apertures and the other which operates on the right and center apertures. First considering the left and center half, a complex multiplication unit 120 is provided and is connected by two lines 86 and 88 to receive the in-phase and quadrature components of the range doppler map from the FFT processor 84. The complex multiplier unit 120 is also connected to the lines 106 and 108 to receive the in-phase and quadrature components of the range doppler map from the digital FFT processor 104. These input signals are derived from the undelayed data sets described above. The output from the complex multiplication unit 120 is an in-phase and quadrature range doppler map which represents the phase angle between the two input signal sets and this information is presented via the lines 122 and 124 to an angle processor 125. Angle processor 125 performs a linear regression on the phase data in each range bin and derives a linear frequency versus angle relationship for each range bin. It then averages all the range data to derive a best estimate of angle versus doppler information. The output from the angle processor 125 is provided as a phase calibration signal on the line 126 and this signal $\theta_{lc_i}$ represents the measured angle versus doppler interferometer characteristic for the left-center interferometer. (Double subscripts (e.g., $\theta_{lc_i}$) indicate the apertures utilized (left-center) and a doppler frequency index (i)). Each half of the calibration unit also includes a magnitude detector, such as magnitude detector 128 and measures the magnitude of the complex vectors in both range-doppler maps of the left and center apertures. The magnitude detector 128 receives the output of FFT processor 84 on lines 86 and 88 and the output of the FFT processor 104 on lines 106 and 108. The output from the magnitude detector 128 is presented on the lines 130 and 132 to the amplitude processor 133. The signals on this line represent the magnitude of the range doppler map from the left aperture and the range doppler map from the center aperture. The amplitude processor 133 provides an amplitude calibration signal $A_{lc}$ on the line 134 which is the ratio of the average clutter powers on the left and center apertures and is related to the amplitude difference in clutter spectrum between adjacent apertures.

In a similar fashion, the other half of the triple interferometric signal calibration unit also includes a complex multiplication unit 140 which is connected to the digital FFT processor 94 to receive the range doppler map from the center channel and also to the digital FFT processor 114 to receive the right aperture range doppler map. An angle processor 145 produces a phase calibration signal on the line 146 $\theta_{cR_i}$, which is the measured angle versus doppler characteristic of the center-right interferometer. A magnitude detector 148 receives a complex range doppler map from the right aperture and the center aperture and provides respective range doppler magnitudes to an amplitude processor 153. As before, the amplitude processor 153 provides an amplitude calibration signal on the line 154 $A_{CR}$ which is the ratio of the average clutter power in the center and right apertures. The data processed in this half of unit 158 is derived from the delayed data sets described above.

A phase correction calculation is performed in a clutter phase calculator unit 160 in the following manner.

Phase computation unit 169 calculates the phase difference between the delayed and undelayed data sets described hereabove. It accepts as an input the delay, N, on line 54 and generates on a doppler filter basis the phase $2\pi N f_i \tau$ where $f_i$ is the doppler frequency for each doppler filter and $\tau$ is the radar PRI. The output from the phase computation unit 169 is a phase difference signal presented on line 170 to phase adders 172 and 174 where it is coherently added to the phase calibration signals on lines 126 and 146 to form a left-center phase correction signal $\theta_{lc_i}$ on a line 176 and a center-right phase correction signal $\theta_{cr_i}$ on a line 178. The phase correction signals are composite signals representing a time delay phase correction, the positional phase relationship between adjacent interferometers and a phase due to motion of the assumed moving targets. The resultant linear phase correction is significantly reduced by the use of the time delay feature, so that over a doppler filter width the phase deviation is small, allowing for a high degree of clutter cancellation across the whole filter.

Figure 4:
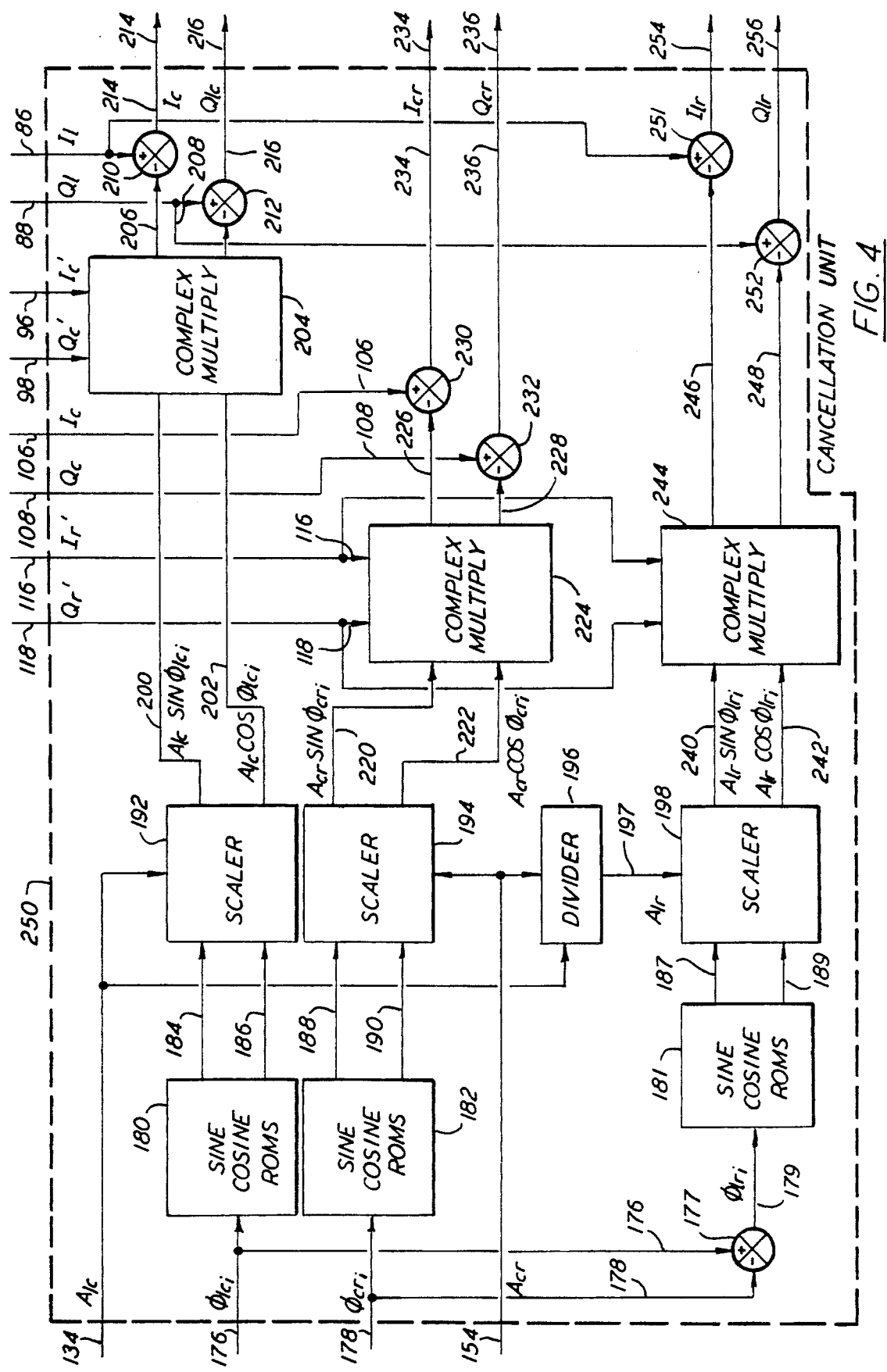
FIG. 4 is a drawing in block diagram form of the cancellation unit shown in FIG. 1.
Figure 5:
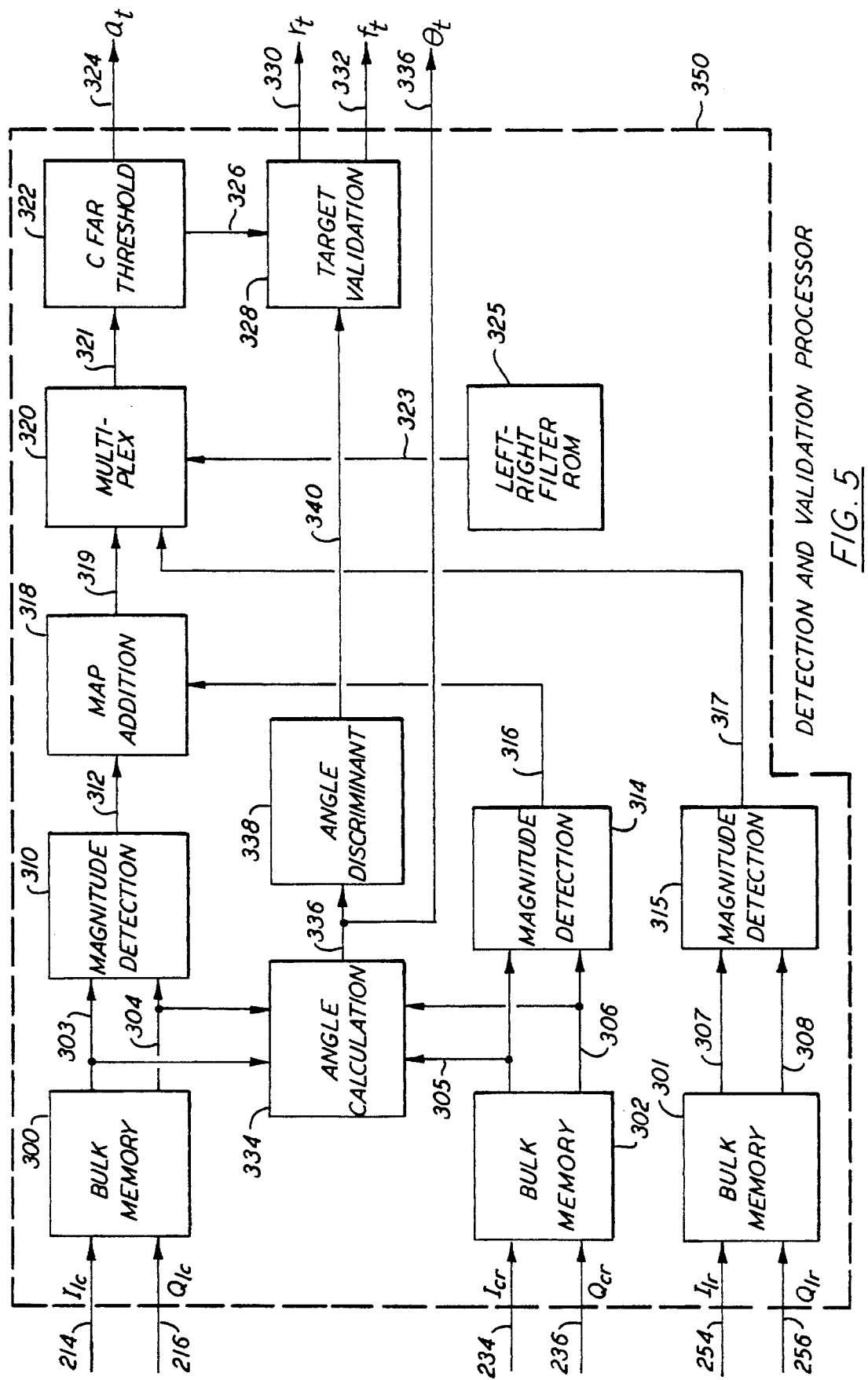
FIG. 5 is a drawing in block diagram form depicting the detection and validation processor shown in FIG. 1.

Referring additionally to FIG. 4, these signals are then fed to the cancellation unit 250. It should be understood that the signals from the FFT processors when presented to the cancellation unit must be delayed for a predetermined period. This delay period allows the same signals to be processed by the triple interferometric signal calibration unit and the clutter phase calculator unit prior to being combined in the cancellation unit. Lines 176 and 178 go to a sine-cosine ROM 180 and a sine-cosine ROM 182, respectively. The sine and cosine ROMs calculate the sine and cosine associated with the respective values of phase fed thereto. The output from the ROMs 180 and 182 on the lines 184, 186, 188 and 190 are the $\cos(\phi_{lc_i})$, the $\sin(\phi_{lc_i})$, the $\cos(\phi_{cr_i})$ and the $\sin(\phi_{cr_i})$ respectively and are fed to scaling units 192 and 194 when they are multiplied by the amplitude calibration signals for the respective interferometer. The outputs from the scaling unit 192 are fed via lines 200 $A_{lc} \sin\phi_{lc_i}$ and 202 $A_{lc} \cos\phi_{lc_i}$ to the complex multiplication unit, and 204 the output from the scaling unit 194 is fed via lines 220 $A_{cr} \sin\phi_{lc_i}$ and 222 $A_{cr} \cos\phi_{cr_i}$ to the complex multiplication unit 224. The signals on these lines are correction factors which are applied to the delayed data sets which are the outputs of the digital FFT processors 94 and 114, respectively. The complex multiplication unit 204 serves to scale the vector represented by signal lines 96 and 98 by a factor $A_{lc}$ and to rotate the vector by a phase $\phi_{lc_i}$ (the subscript i indicating segmentation in doppler frequency). Likewise, the complex multiplication unit 224 serves to scale the vector represented by signal lines 116 and 118 by a factor $A_{cr}$ and to rotate the vector by a phase $\phi_{cr_i}$.

The outputs of complex multiplication unit 204 appear on signal lines 206 and 208 and represent compensated center aperture information. These signal lines go to summing units 210 and 212, respectively. The outputs of complex multiplication unit 224 appear on signal lines 226 and 228 and represent compensated right aperture information. These signal lines are fed to summing units 230 and 232, respectively. The subtraction of compensated center aperture information on lines 206 and 208 from uncompensated left aperture information $I_l$ and $Q_l$ on lines 86 and 88 takes place in summing units 210 and 212, respectively. The subtraction of compensated right aperture information on lines 226 and 228 from uncompensated center aperture information on $I_c$ and $Q_c$ on lines 106 and 108 takes place in summing units 230 and 232, respectively. The outputs of the summing units 210 and 212 appear on signal lines 214 and 216 and are the clutter cancelled signals $I_{lc}$ and $Q_{lc}$. The outputs of the summing units 230 and 232 appear on signal lines 234 and 236 and are the clutter cancelled signals $I_{cr}$ and $Q_{cr}$.

A particular feature of the present invention involves clutter cancellation and moving target enhancement based on the data sets from the two outer apertures, i.e., the left aperture and the right aperture. To accomplish this the existing or the previously described data from the digital FFT processors and the triple interferometric signal calibration unit 158 and the clutter phase calculator 160 are combined in a procedure which is similar to that heretofore described. An outer array phase correction signal $\phi_{lr_i}$ on line 179 is derived by combining in summing node 177 the left center phase correction signal $\phi_{lc_i}$ on the line 176 and the center right phase correction signal $\phi_{cr_i}$ on the line 178. The outer array phase correction signal is presented to a sine-cosine ROM 181 which calculates the sine and cosine associated with the respective values of phase fed thereto. The outputs from the ROM 181 on the lines 187 and 189 are the $\cos(\phi_{lr_i})$ and the $\sin(\phi_{lr_i})$, respectively, and are fed to a scaling unit 198. To determine the correct normalizing factor for the left-right aperture, a divider 196 is connected to the line 134 and the line 154 receives the left-center amplitude calibration signal $A_{lc}$ on the line 134 and the center-right amplitude calibration signal $A_{cr}$ on the line 154 and divides one by the other to derive the left-right amplitude calibration signal $A_{lr}$ on line 197. Outputs from the scaler unit 198 on the lines 240 and 242 represent the amplitude and phase correction signal $A_{lr}\sin\phi_{lr_i}$ and the $A_{lr}\cos\phi_{lr_i}$. The complex multiplication unit 244 serves to scale the vector represented by the delayed right aperture signal lines 116 and 118 by a factor $A_{lr}$ and to rotate the vector by a phase $\phi_{lr_i}$. The output signals of the complex multiplication unit 244 appear on the lines 246 and 248 and represent compensated right aperture information. These signals are presented to the summing nodes 251 and 252. Subtraction of the compensated right aperture information on the lines 246 and 248 from uncompensated left aperture information $I_l$ and $Q_l$ on the lines 86 and 88 takes place in the summing units 251 and 252. The outputs of the summing units 251 and 252 appear on the lines 254 and 256 and are the clutter cancelled signals $I_{lr}$ and $Q_{lr}$. At this point, this output signal pair on the lines 254 and 256 from the cancellation unit 250 possesses greatly enhanced target low velocity characteristics. This information is then presented to a detection and validation processor 350.

The $I_{lc}$ signal on the line 214 and $Q_{lc}$ signal on the line 216 are and stored in a bulk memory unit 300 while the $I_{cr}$ signal on the line 234 and $Q_{cr}$ signal on the line 236 are and stored in a bulk memory unit 302. These memory units are sized so that they contain $2N_b$ bits of information for $N_r$ range bins by $N_d$ doppler filters. Magnitude detectors 310 and 314 are connected to the output of the bulk memory units 300 and 302, respectively, and perform a conventional magnitude detection routine on the information stored in the bulk memory which involves taking the larger of the two quadrature components and adding to it one-half of the smaller component. This provides a sufficiently accurate representation of true magnitude. The outputs of the magnitude detectors are signal lines 312 and 316 which go to a map addition 318. This unit adds magnitudes for each of $N_r$ range cells by $N_d$ doppler filters from its two input lines.

A bulk memory unit 301 receives the $I_{lr}$ signal on the line 254 and the $Q_{lr}$ signal on the line 256 and stores them in a range doppler format. Memory unit 301 is sized so that it contains two $N_b$ bits of information for $N_r$ range bins by $N_o$ doppler filters. It should be understood that the doppler filters $N_o$ for the outer array processing is less than the doppler filters $N_d$ for the adjacent array processing and $N_o$ is the doppler filters in the low doppler region where the outer array processing is preferred.

Figure 6:
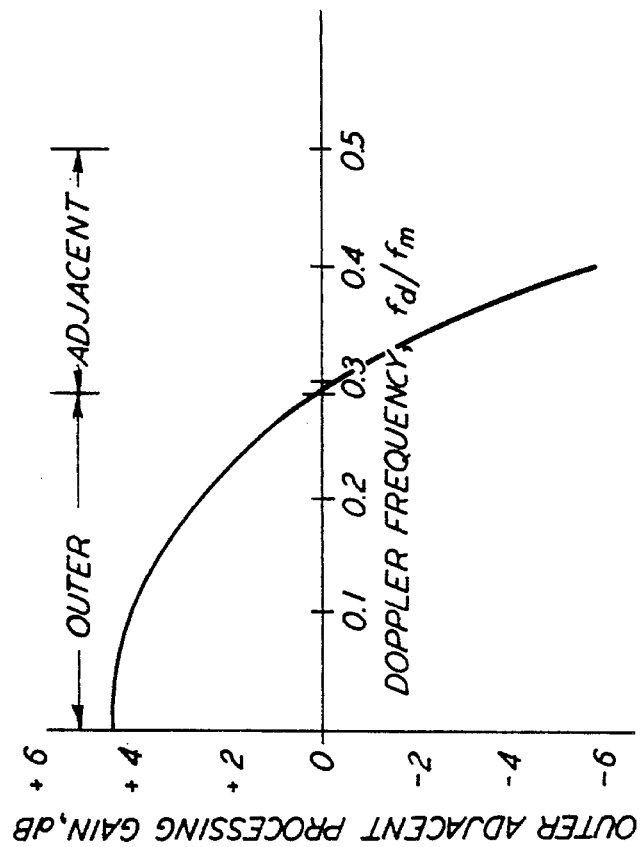
FIG. 6 is a graph illustrating the benefit obtained by outer array processing.
Figure 7:
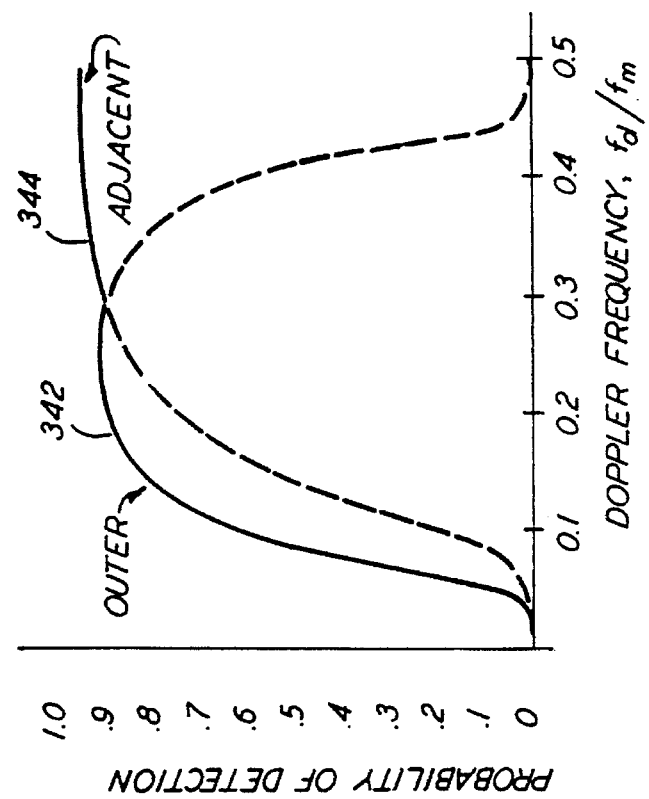
FIG. 7 is a graph illustrating probabilities of detection for slow moving targets.

A magnitude detector 315 is connected to the output of the bulk memory unit 301 and performs a conventional magnitude detection routine on the information stored in the bulk memory. This magnitude detection is of the same type described hereabove with respect to both the magnitude detectors 310 and 314. The output from the magnitude detection unit 315 is presented on the line 317 to a multiplex unit 320 which also receives an input signal on the line 319 from the map addition unit 318. The multiplex unit 320 is controlled by a signal on the line 323 from the left-right filter ROM 325. The left-right filter ROM 325 identifies as a function of velocity, v, pulse repetition frequency, $f_r$, and the number of samples taken, $N_d$, the doppler filters for which the outer array processing is preferred over adjacent array processing. In other words, the resultant range doppler map on the signal line 321 represents the combination of outer array processing for the low doppler regions ann adjacent array processing for all other regions. The benefit obtained by outer array processing can probably be best understood by reference to FIG. 6. The outer adjacent processing gain is shown in dB as a function of the ratio of doppler frequency, $f_d/f_m$ the matched frequency $f_m$ (2 v/d). It should be noted that for doppler frequencies less than about 0.29 $f_d/f_m$ the gain is greater than zero by as much as 4.4 dB. However, for doppler frequencies above 0.29 $f_d/f_m$ the outer processing techniques experiences a net loss in dB with respect to adjacent processing so that in this region it is desirable to use the conventional adjacent processing technique. The resultant range doppler map on the signal line 321 goes to a CFAR type thresholding unit 322. The average signal levels are computed in the range and/or doppler dimension and potential targets are declared if they exceed the local averages by a predetermined threshold factor. Advantage of outer array processing for slowly moving targets for improving the probability of detection of slow moving targets is seen in FIG. 7. The curve 342 represents probability of detection for outer array processing while the curve 344 represents the probability of detection for adjacent array processing. It will be noticed that for low doppler frequencies, i.e. less than 0.29 $f_d/f_m$ the outer aperture processing demonstrates a higher degree of detectability. Results shown on this graph are significant in two ways. For a given doppler frequency $f_d/f_m$ the probability of detection has been increased. In another way, for a given probability of detection the doppler frequency or the target velocity at which this level is achieved has been reduced. Minimum detectable velocity, which is defined as the lowest velocity for which the probability of detection is 0.5, is reduced by 40% by the use of outer array processing as compared to adjacent array processing. This is demonstrated by the following anaylis:

For a variety of detection models, the signal-to-noise required, $S/N_r$, is a function of probability of detection, $P_d$, and probability of false alarm, $P_{fa}$. In particular for the Swerling I model the relationship is given by $$S/N_r = \frac{\ln P_d}{\ln P_{fa}} - 1 \quad (1)$$

The probability $P_d=0.50$ is usually associated with the minimum speed detectable target of velocity $v_m$ in MTI systems.

The target signal strength achieved by processing adjacent apertures, $S/N_a$, following adjacent map addition is given by $$S/N_a = 1.44 (\sin^2 (kv_{m_a})) S'/N \quad (2)$$

where the factor 1.44 accounts for noncoherent map addition, the factor k is a proportionality constant of the system and $S'/N$ is a nominal signal-to-noise achieved.

The target signal strength achieved by processing the outer apertures, $S/N_o$, is given by $$S/N_o = 1.0(\sin^2 (2kv_{m_o}))S'/N \quad (3)$$

where there is no longer map addition and where the factor 2 accounts for the doubled spacing between outer apertures as compared to adjacent apertures.

For minimum speed detectable targets $$S/N_r = S/N_o = S/N_a \quad (4)$$

so that $$1.44 \sin^2 (kv_{m_a}) = 1.0 \sin^2 (2kv_{m_o}) \quad (5)$$

For low speed targets, the small angle approximation can be used to yield $$1.44 \, v_{m_a}^2 = 4.0 \, v_{m_o}^2 \quad (6)$$

The result is $$v_{m_o} = 0.60 \, v_{m_a} \quad (7)$$

which shows that the minimum speed detectable target that results from outer aperture processing, $v_{m_o}$, is 40 percent lower in velocity than the minimum speed detectable target that results from adjacent aperture processing, $v_{m_a}$.

The outputs 326 are then stored temporarily while target angle processing is completed. The outputs of the bulk memory units 300 and 302 which represent the signals $I_{lc}$, $Q_{lc}$, $I_{cr}$ and $Q_{cr}$ are presented to an angle calculation unit 334. This consists of a complex multiplier unit of conventional design and would typically contain four multipliers and two summing devices in which the inputs are complex multiplied to obtain complex signals from which the angle to the target can be derived. Also included in the angle calculation unit 334 is an arc tangent ROM which takes the in-phase and quadrature information and derives an electrical phase angle. The electrical phase angle is then scaled by the interferometer scale factor to give the true angular field position for all signals in the total map of $N_r$ range bins by $N_d$ doppler filters and appears on signal line 336.

According to a particular feature of the present invention, an angle discrimination unit 338 is provided and is connected to the angle calculation unit 334 and the target validation unit 328. The angle discrimination unit receives doppler and angle information from the angle calculation unit 334 and evaluates the angular information of all signals against the known angle doppler interferometric relationship. A discrete window is provided about the known linear relationship and signals falling within the discrete window will be identified as fixed targets and rejected. Candidate signals falling outside the discrete window will be identified as potential moving targets and will pass to the target validation unit 328 on signal line 340. The target validation unit correlates potential moving targets which have passed an amplitude threshold on signal line 326 with potential moving targets which have passed an angle discrimination test on signal line 340. It should be noted that the angle for moving targets detected by the outer array processing can still be performed accurately by adjacent array processing. Even though adjacent array processing did not initially identify certain low velocity targets, once identified the angle calculation to these low velocity targets is still valid and highly accurate. The output of the target validation unit is the range, $r_t$, and doppler, $f_t$, locations of the true moving targets which have passed both amplitude and angle conditions on signal lines 330 and 332. Available on signal line 324 is amplitude information, $a_t$, for these moving targets and available on signal line 336 is the angular location $\theta_t$, of these moving targets with respect to antenna boresite.

Although this invention has been shown and described with respect to a preferred embodiment, it will be understood by those skilled in this art that various changes in form and detail thereof may be made without departing from the spirit and scope of the claimed invention.

I claim:

1. An airborne moving target indicator (AMTI) for effectively detecting and measuring slowly moving targets in main beam clutter from a moving platform, comprising:

antenna means having a transmit aperture for transmitting radar pulses at a pulse repetition frequency (PRF), and having three spaced-apart receive apertures; a left aperture (12), a center aperture (14), and a right aperture (16) for receiving radar return signals;

receiver means (18, 20, 22) for providing in-phase (I) and quadrature (Q) component signals associated with each receive aperture in response to the radar return signals;

clock means (51) for providing a timing signal (52) related to each transmitted radar pulse;

delay means (53) for providing a delay signal in response to platform movement, PRF and interaperture spacing;

storage means including a first array storage (70) for providing an undelayed set of data (80, 82) in time domain format in response to the timing signal and the in-phase and quadrature component signals associated with the left aperture, a second array storage (72) for providing a delayed set of data (90, 92) in time domain format in response to the timing signals, the delay signal and the in-phase and quadrature component signals associated with the center aperture, a third array storage (74) for providing an undelayed set of data in time domain format in response to the timing signal and the in-phase and quadrature component signals associated with the center aperture, and a fourth array storage (76) for providing a delayed set of data in time domain format in response to the timing signal, delay signal and the in-phase and quadrature component signals associated with the right aperture;

FFT means including a first FFT processor (84) for providing an undelayed set of data in frequency domain format associated with the left aperture in response to the undelayed set of data in time domain associated with the left aperture, a second FFT processor (94) for providing a delayed set of data in frequency domain format associated with the center aperture in response to the delayed set of data set in time domain format associated with the center aperture, a third FFT processor (104) for providing an undelayed set of data in frequency domain format associated with the center aperture in response to the undelayed set of data in time domain format associated with the center aperture, and a fourth FFT processor (114) for providing a delayed set of data in frequency domain format associated with the right aperture in response to the delayed set of data in time domain format associated with the right aperture;

interferometer means (158) for providing a left/center phase calibration signal (126) indicative of the measured angle versus dopper characteristic for a left/center interferometer comprising the left and center apertures in response to the undelayed sets of data in frequency domain format associated with the left and center apertures, for providing a left/center amplitude calibration signal (134) indicative of the amplitude difference in clutter spectrum between the left and center apertures in response to the undelayed sets of data in frequency domain format associated with the left and center apertures, for providing a center/right phase calibration signal (146) indicative of the measured angle versus doppler characteristic for a center/right interferometer comprising the center and right apertures in response to the delayed sets of data in frequency domain format associated with the center and right apertures, for providing a center/right amplitude calibration signal indicative of the amplitude difference in clutter spectrum between the center and right apertures in response to the delayed data sets in frequency domain format associated with the center and right apertures;

phase computation means (169) for providing a phase difference signal indicative of the phase difference between the delayed and undelayed sets of data in response to the delay signal;

phase calculation means (160) for providing a left/center phase correction signal (176) for the left/center interferometer indicative of a time delay phase correction, the positional phase relationship between the left and center apertures, and a phase due to motion of the targets in response to the phase addition of the phase difference signal and the left/center phase calibration signal, and for providing a center/right phase correction signal (178) for the center/right interferometer indicative of the time delay phase correction, the positional phase relationship between the center and right apertures, and the phase due to motion of the targets in response to the phase addition of the phase difference signal and the center/right phase calibration signal;

cancellation means for providing left/center clutter cancelled in-phase and quadrature component signals (214, 216) that have significantly suppressed clutter characteristics in response to the left/center phase correction signal (176), the left/center amplitude calibration signal (134), and the difference (210, 212) between the undelayed set of data in frequency domain format associated with the left aperture (86, 88) and the delayed set of data in frequency domain format associated with the center aperture (96, 98); for providing center/right clutter cancelled in-phase and quadrature component signals (234, 236) that have significantly suppressed clutter characteristics in response to the center/right phase correction signal (178), the center/right amplitude calibration signal (154), and the difference (230, 232) between the undelayed set of data in frequency domain format associated with the center aperture (106, 108) and the delayed set of data in frequency domain format associated with the right aperture (116, 118); and for providing left/right clutter cancelled in-phase and quadrature component signals (254, 256) that have significantly suppressed clutter characteristics in response to the difference (177) between the left/center phase correction signal (176) and the center/right phase correction signal (178), the ratio (196) of the left/center amplitude calibration signal (134) and the center/right amplitude calibration signal (154), and the difference between the (251, 252) delayed set of data in frequency domain format associated with the right aperture (116, 118) and the undelayed set of data in frequency domain format associated with the left aperture (86, 88); and detection means (350) connected to the cancellation/enhancement means, for providing range ($r_t$), doppler ($f_t$), amplitude ($a_t$), and angle ($\theta_t$) signals indicative of target motion in response to the clutter cancelled left/center, center/right, and left/right in-phase and quadrature signals.

2. An AMTI according to claim 1 wherein said cancellation means (250) includes:

a first ROM (180) for providing signals (184, 186) indicative of the sine and cosine of the left/center phase correction signal;

first scaling means (192) for providing first correction factor signals (200, 212) indicative of the product of the left/center amplitude calibration signal and the signals indicative of the sine and cosine of the left/center phase correction signals;

first complex multiplication means (204) for providing compensated center signals (206, 208) indicative of the delayed set of data associated with the center aperture scaled by the left/center amplitude calibration signal and rotated by the left/center phase correction signal;

first coherent adder means (210, 212) for providing the left/center clutter cancelled in-phase and quadrature component signals in response to the subtraction of the compensated center signals from the undelayed set of data in frequency domain format associated with the left aperture;

a second ROM (182) for providing signals (188, 190) indicative of the sine and cosine of the center/right phase correction signal;

second scaling means (194) for providing second correction factor signals (220, 222) indicative of the product of the center/right amplitude calibration signal and the signals indicative of the sine and cosine of the left/center phase correction signals;

second complex multiplication means (224) for providing first compensated right signals (226, 228) indicative of the delayed set of data associated with the right aperture scaled by the center/right amplitude calibration signal and rotated by the center/right phase correction signal; and second coherent adder means (230, 232) for providing the center/right clutter cancelled in-phase and quadrature component signals in response to the subtraction of the first compensated right signal from the undelayed set of data in frequency domain format associated with the center aperture;

means (177) for providing an outer array phase correction signal (179) in response to the difference between the left/center phase correction signal and the center/right phase correction signal;

means (196) for providing a left/right amplitude calibration signal (197) in response to the ratio of the left/center amplitude calibration signal and the center/right amplitude calibration signal;

a third ROM (181) for providing signals (187, 189) indicative of the sine and cosine of the outer array phase correction signal;

third scaling means (198) for providing third correct ion factor signals (240, 242) indicative of the product of the left/right amplitude calibration signal and the signals indicative of the sine and cosine of the outer array phase correction signals;

second complex multiplication means (224) for providing compensated right signals (226, 228) indicative of the delayed set of data associated with the right aperture scaled by the left/right amplitude calibration signal and rotated by the outer array phase correction signal; and third coherent adder means (251, 252) for providing the left/right clutter cancelled in-phase and quadrature component signals in response to the subtraction of the second compensated right signal from the undelayed set of data in frequency domain format associated with the left aperture.

3. An AMTI according to claim 2 wherein said detection means 350 includes:

means (334) for providing the angle signal ($\theta_t$) in response to the clutter cancelled left/center and center/right I and Q signals;

means (300–302, 310, 314, 315) for providing magnitude signals related to the left/center, center/right and left/right interferometers in response to the respective left/center, center/right and left/right clutter cancelled I and Q signals;

ROM means (325) for providing a control signal (323) indicative of the doppler filters for which the outer array processing is preferred over adjacent array processing in response to velocity (v), PRF, and the number of samples taken (Nd);

multiplex means (320) for providing a range doppler map signal (321) indicative of the combination of outer array processing for the low doppler regions and adjacent array processing for all other regions in response to the magnitude signals; and means (322, 326) for providing the amplitude ($a_t$), range ($r_t$) and doppler ($f_t$) signals in response to the angle signal ($\theta_t$) and the range doppler map signal (321).

4. An AMTI according to claim 1 wherein the time delay phase correction is approximately 0.75 d/v, where (d) is the interaperture spacing and (v) is the platform velocity.

* * * * *